(12) United States Patent
Alpert et al.

(10) Patent No.: US 12,423,719 B2
(45) Date of Patent: Sep. 23, 2025

(54) TREND PREDICTION

(71) Applicants: Martin A. Alpert, Beachwood, OH (US); Bradley H. Owen, Chagrin Falls, OH (US); Derek S.M. Rymers, Westerville, OH (US)

(72) Inventors: Martin A. Alpert, Beachwood, OH (US); Bradley H. Owen, Chagrin Falls, OH (US); Derek S.M. Rymers, Westerville, OH (US)

( * ) Notice: Subject to any disclaimer, the term of this patent is extended or adjusted under 35 U.S.C. 154(b) by 123 days.

(21) Appl. No.: 17/648,357

(22) Filed: Jan. 19, 2022

(65) Prior Publication Data

US 2023/0230110 A1  Jul. 20, 2023

(51) Int. Cl.
*G06Q 30/0202* (2023.01)
*G06V 30/19* (2022.01)

(52) U.S. Cl.
CPC ... *G06Q 30/0202* (2013.01); *G06Q 30/02022* (2025.08)

(58) Field of Classification Search
CPC .............. G06Q 30/0202; G06Q 30/02022
See application file for complete search history.

(56) References Cited

U.S. PATENT DOCUMENTS

| | | | |
|---|---|---|---|
| 9,288,123 B1 * | 3/2016 | Safford | G06Q 50/01 |
| 10,325,274 B2 | 6/2019 | Tuteja et al. | |
| 2007/0100875 A1 * | 5/2007 | Chi | G06Q 30/02 |
| | | | 707/999.102 |
| 2012/0158613 A1 * | 6/2012 | Bollen | G06Q 30/02 |
| | | | 705/36 R |
| 2013/0246463 A1 * | 9/2013 | Trim | H04L 67/00 |
| | | | 707/E17.014 |
| 2013/0290172 A1 * | 10/2013 | Mashinsky | G06Q 20/28 |
| | | | 705/39 |
| 2014/0172751 A1 * | 6/2014 | Greenwood | G06Q 40/06 |
| | | | 705/36 R |
| 2015/0006298 A1 * | 1/2015 | Ross | G06Q 30/0277 |
| | | | 705/14.66 |
| 2015/0012593 A1 * | 1/2015 | Phillips | H04L 47/70 |
| | | | 709/204 |
| 2016/0188703 A1 * | 6/2016 | Huang | G06Q 50/10 |
| | | | 707/750 |
| 2017/0287038 A1 * | 10/2017 | Krasadakis | G06Q 30/0201 |
| 2019/0102374 A1 * | 4/2019 | Tiwari | G06F 40/284 |
| 2019/0171706 A1 * | 6/2019 | Dubyak | G06F 40/284 |
| 2020/0057952 A1 * | 2/2020 | Vick | G06Q 10/04 |
| 2022/0172258 A1 * | 6/2022 | Jain | G06Q 30/0201 |

(Continued)

OTHER PUBLICATIONS

Chen, I-Fei, and Chi-Jie Lu. "Sales forecasting by combining clustering and machine-learning techniques for computer retailing." Neural Computing and Applications 28.9 (2017): 2633-2647. (Year: 2017).*

*Primary Examiner* — Andre D Boyce
(74) *Attorney, Agent, or Firm* — Renner, Otto, Boisselle & Sklar, LLP

(57) ABSTRACT

Predicting trends may include obtaining trend data from one or more sources, extracting a plurality of trends from the trend data, and producing permutations combining terms or concepts appearing in the plurality of trends to create trend candidates. A first term from a first trend or concept in the plurality of trends may be combined with a second term or concept from a second trend in the plurality of trends.

30 Claims, 10 Drawing Sheets

(56) References Cited

U.S. PATENT DOCUMENTS

| | | | | |
|---|---|---|---|---|
| 2023/0112589 A1* | 4/2023 | Kanagovi | ................ | G06N 3/08 |
| | | | | 707/739 |
| 2023/0116515 A1* | 4/2023 | Kanagovi | ............. | G06F 16/353 |
| | | | | 704/9 |
| 2023/0196235 A1* | 6/2023 | Turan | ................ | G06Q 30/0202 |
| | | | | 705/7.25 |

* cited by examiner

```
filename = 'Grouped_Trends_CSV – Copy.csv columns = []
rows = []

Def powerset(fullset):
    listsub = list(fullset)
    subsets = []
    for l in range (2**len(listsub)):
        subset = []
        for k in range(len(listsub)):
            if l & 1<<k:
                subset.append(listsub[k])
        subsets.append(subset)
    return subsets With open(filename, 'r') as csvFile:
    cr = csv.reader(csvFile columns = next(cr)

for row in cr:
        rows.append(row)

print(f'rowCount: {len(rows)}')
```

Figure 2

```
trend_permutation_powerset
cheesecake
tacos
cheesecake tacos
potatoes
cheesecake potatoes
tacos potatoes
cheesecake tacos potatoes
red
cheesecake red
tacos red
cheesecake tacos red
potatoes red
cheesecake potatoes red
tacos potatoes red
cheesecake tacos potatoes red
cloud
cheesecake cloud
tacos cloud
cheesecake tacos cloud
potatoes cloud
cheesecake potatoes cloud
tacos potatoes cloud
cheesecake tacos potatoes cloud
```

| Trend_Permutation | Pred_ratio | Group | Interpretation |
|---|---|---|---|
| cheesecake | N/A | | |
| tacos | N/A | | |
| cheesecake tacos | 25.36846121 | 1 | Cheesecake Tacos (cheesecake in a taco shell) |
| potatoes | N/A | | |
| cheesecake potatoes | 20.54481316 | 1 | Cheesecake accordion potatoes (cheesecake inside of a decorative potato) |
| tacos potatoes | 12.42404072 | 1 | Tacos filled accordion potatoes (tacos inside of decorative potatoes) |
| cheesecake tacos potatoes | N/A | | |
| red | N/A | | |
| cheesecake red | 17.98310036 | 1 | Fried spicy cheesecake |
| tacos red | N/A | | |
| cheesecake tacos red | N/A | | |
| potatoes red | N/A | | |
| cheesecake potatoes red | N/A | | |
| tacos potatoes red | N/A | | |
| cheesecake tacos potatoes red | N/A | | |
| cloud | N/A | | |
| cheesecake cloud | 23.90917477 | 1 | Cheesecake flavored cloudbread |
| tacos cloud | 15.78840234 | 1 | Taco flavored cloud bread |
| cheesecake tacos cloud | N/A | | |
| potatoes cloud | 10.96475429 | 1 | Accordion (expandable) Cloud bread (re-introduction) |
| cheesecake potatoes cloud | N/A | | |
| tacos potatoes cloud | N/A | | |
| cheesecake tacos potatoes cloud | N/A | | |
| red cloud | 8.403041484 | 1 | Fried spicy cloud bread |
| cheesecake red cloud | N/A | | |
| tacos red cloud | N/A | | |

Figure 4

| Predicted Trend | Predicted Ratio | Group | Interpretation | Previous Trend | Real Product |
|---|---|---|---|---|---|
| cheesecake tacos | 25.36845121 | | 1 Cheesecake Tacos (che | no | yes |
| cheesecake potatoes | 20.54481316 | | 1 Cheesecake accordian | no | no |
| tacos potatoes | 12.42404072 | | 1 Tacos filled accordian | no | yes |
| cheesecake red | 17.98310036 | | 1 Fried spicy cheesecake | yes | yes |
| cheesecake cloud | 23.90917477 | | 1 Cheesecake flavored cl | no | no |
| tacos cloud | 15.78840234 | | 1 Taco flavored cloud br | no | no |
| potatoes cloud | 10.96475429 | | 1 Accordian (expandable | no | no |
| red cloud | 8.403041484 | | 1 Fried spicy cloud bread | no | no |
| cheesecake bake | 19.02940482 | | 2 Cheesecake tray bake | no | yes |
| tacos bake | 10.90863238 | | 2 Taco tray bake | no | yes |
| cloud bake | 9.449345946 | | 2 Cloud bread tray bake | no | no |
| cheesecake cloud bake | 21.68867944 | | 2 Cloud bread cheesecak | no | no |
| tacos cloud bake | 12.04879356 | | 2 Cloud bread tacos tray | no | no |
| cheesecake mac | 22.76876793 | | 3 Cheesecake mac and c | no | no |
| tacos mac | 14.64799955 | | 3 Mac & cheese tacos | yes | yes |
| potatoes mac | 9.824347446 | | 3 Accordian potato mac | no | no |
| cloud mac | 13.18870906 | | 3 Cloud bread mac and c | no | no |
| bake mac | 8.308939105 | | 3 Mac & cheese tray bak | yes | yes |
| tacos bake mac | 11.28852233 | | 3 Taco mac & cheese tra | no | yes |
| potatoes bake mac | 8.072756961 | | 3 Accordian potato mac and c | no | no |
| cloud bake mac | 10.31566647 | | 3 Cloud bread mac and c | no | no |
| cheesecake tortilla | 31.58221631 | | 4 Cheesecake fried swee | no | no |
| tacos tortilla | 23.46144388 | | 4 Tacos on fried sweet tc | yes | yes |
| potatoes tortilla | 18.63779583 | | 4 Accordian potatoes + f | no | no |
| red tortilla | 15.07608302 | | 4 Fried crispy spicy tortill | yes | yes |
| cloud tortilla | 22.00215744 | | 4 Cloudbread tortilla folt | no | no |

Figure 5

TREND PREDICTION

BACKGROUND

Social networks and online activity in general have pervaded the daily life of millions of people throughout the world. Social networking and social sharing platforms facilitate billions of shared messages on a daily basis. Many users post messages regarding recent purchases, product reviews, or simply discussing products that are interesting to them. Marketers try to use data from those messages to supplement traditional marketing and advertising. Social networks individually attempt to highlight the most important or active data as trends. But gathering data from a variety of heterogeneous social platforms, aggregating that data, and presenting readily consumable information or goods to users has, so far, proven evasive for marketers. Much of the disparate data associated with trends is useless unless it is processed, synthesized, and/or transformed into something useful. While conventional trend data processors may exist, they apply to only one data set and have other significant drawbacks such as, for example, inefficiencies associated with processing of the data resulting in not recognizing or distinguishing consumer desires.

SUMMARY

Techniques for trend prediction are provided herein. Generally, the techniques of the present disclosure may include various components, such as, for example, a predictive/aggregation component, a trend generation component, and a trend sale component.

The predictive/aggregation component may obtain trend data from multiple sources, clean, sort, and store the obtained trend data, utilize predictive algorithms to combine a trend with one or more similar or different trends, utilize various statistical techniques to determine a statistical significance associated with the trends, utilize trend analyses as end points for predictive algorithms, predict trends and/or combined trends based on the trend analyses, and share information associated with the predicted trends and/or combined trends to users for purchase and/or to aid business owners (e.g., vendors) in making business decisions.

The trend generation component may present clean, aggregated, trend information (e.g., predicted trends, combined trends, etc.) to users of an application and/or website. The users may browse the trend information and may create trend communities (e.g., trend clubs) based on a particular trend and/or trends. Users may propose new trends based on other trends and the proposed trends may be voted on to determine whether the proposed trend is popular within the respective trend community. If a proposed trend passes a popularity threshold, the trend data associated with the proposed trend may be stored and presented to consumers and/or business owners (as well as trend information from the predictive/aggregation component) creating a trend market environment similar to a consumer-driven marketplace.

The trend sale component may present trends to users for purchase. If a user decides to purchase a trend not currently being offered by a business owner, the user may request that the trend be developed through the trend sale component. As such, whether through the predictive/aggregation component or the trend generation component, consumer demand may influence which trends become popular and/or which trends are developed and/or presented to users for purchase.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 2 illustrates an exemplary permutation algorithm.

FIG. 3 illustrates exemplary permutation outputs.

FIG. 4 illustrates exemplary machine learning model outputs.

FIG. 5 illustrates exemplary predicted trend outputs.

DETAILED DESCRIPTION

The techniques presented herein may provide systems and methods for predicting trends. Key parts may include a predictive/aggregation component, a trend generation component, and a trend sale component. The techniques may obtain trend data from multiple sources and aggregate the trend data for further processing. The aggregated trend data may be representative of current and/or former trends defined by the multiple trend sources.

The techniques may utilize various parsing and analytical techniques (e.g., multiple linear regression, significance tests, etc.) to analyze the aggregated trend data. While the aggregated trend data may be analyzed independently, the techniques may further utilize predictive algorithms, or predictive techniques, such as, for example, artificial intelligence (AI) techniques to further process the aggregated trend data. Some exemplary AI techniques include machine learning and deep learning; however, any suitable AI techniques may be utilized.

The techniques may analyze the aggregated trend data for various purposes, such as, for example, determining if trends having different descriptions are related to the same trend, combining trends into a single trend, combining trends from different trend data sources, determining how trends affect one another, generating new trends, predicting new trends, proposing new trends, presenting trend information to consumers, presenting trend information to vendors and/or for any other suitable purpose.

As stated above, the techniques of the present disclosure may include a trend aggregation component, a trend generator component, and a trend sale component.

Trend Aggregation

Figure 1A:
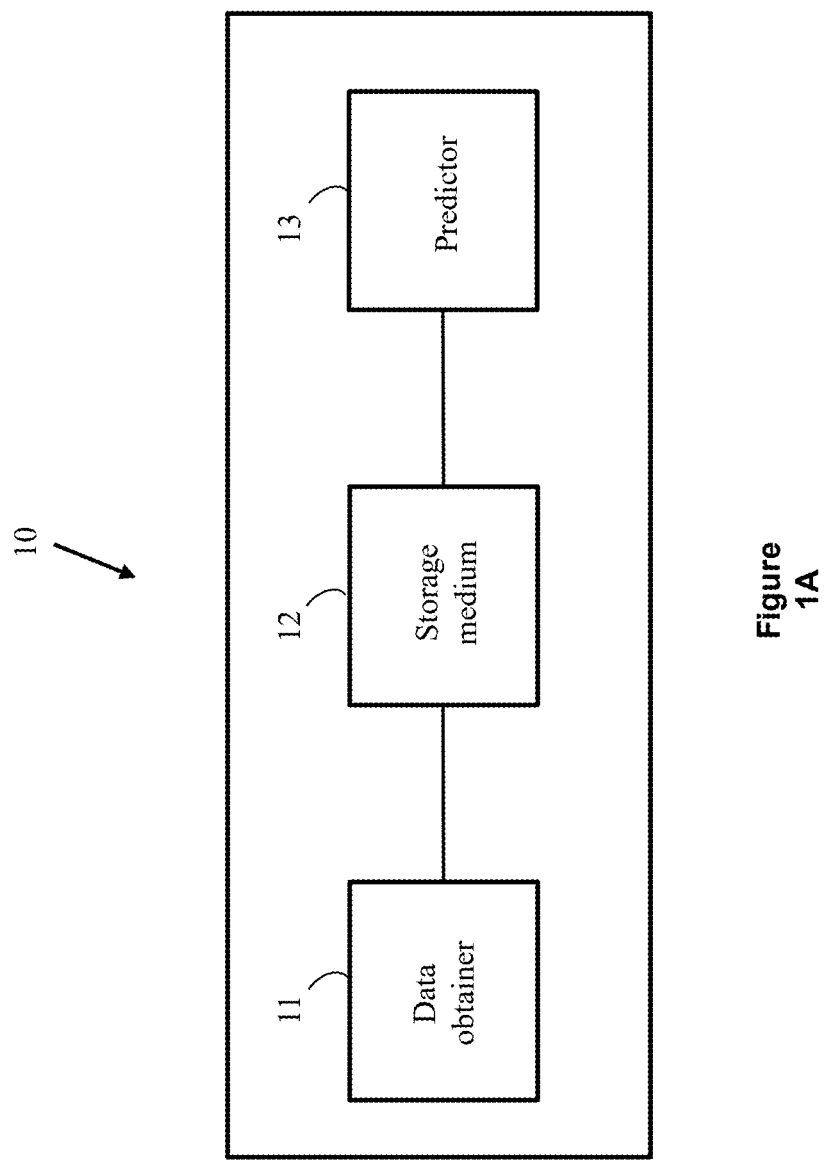
FIG. 1A illustrates a block diagram of an exemplary embodiment of a trend predictor for predicting trends.

With reference to FIG. 1A, a trend predictor 10 may include a data obtainer 11, a storage device 14, and a predictor 13.

The data obtainer 11 may obtain trend data from multiple sources. The trend data may include information about a plurality of trending posts as respectively defined by the multiple sources. Each trending post in the plurality of trending posts may correspond to one or more trends. The data obtainer 11 may store the trend data in the storage medium 12 for further processing.

In some implementations, the sources may be social media platforms and the trend data may be representative of trending posts that users have posted to the social media platforms. The sources may include for example Facebook®, TikTok, Twitter®, Instagram®, etc. Exemplary information associated with the plurality of trending posts may include posts associated with corresponding trends (e.g., corresponding subjects) that experience a surge in popularity on one or more of these social media platforms for a finite period of time. The definition of what is a trend may vary from source to source.

To obtain the trend data, the data obtainer 11 may utilize one or more data scrapers to scrape the trend data from the multiple sources, any suitable method and/or system to obtain the trend data from the multiple sources. While exemplary implementations have been described relative to social media platforms, trending posts, and corresponding trends, it is to be entirely understood that the teachings of the present disclosure may be utilized in any suitable manner for any suitable purpose.

As an example, the trend data may include trending posts that have been posted on multiple social media platforms corresponding to food products (e.g., pickling, pickled products, pineapple, and pineapple products). The data obtainer 11 may utilize the one or more data scrapers to obtain the trend data from the multiple social media platforms and store the trend data as raw aggregated trend data (e.g., historical and present raw data representative of historical and present trends) in the storage medium 12.

The predictor 13 may dynamically clean, organize, store, and process the raw aggregated trend data to predict and/or generate new trend candidates. The predictor 13 may extract meaning from the trend data including meaning from a plurality of trends. For example, the predictor 13 may utilize techniques to determine the meaning of each of the terms associated with a trending post. The predictor 13 may further extract a plurality of trends from the trend data.

The predictor 13 may group trends from the plurality of trends into various groups based on grouping criteria specific to the trend data. For example, the predictor 13 may group trends from the plurality of trends into various groups based, at least in part, on the meaning extracted from the plurality of trends. In some implementations, the predictor 13 may group trends from the plurality of trends such that trends that have equivalent meaning, but not identical expression, may be grouped together as an aggregated trend.

Trend Normalization

Figure 1B:
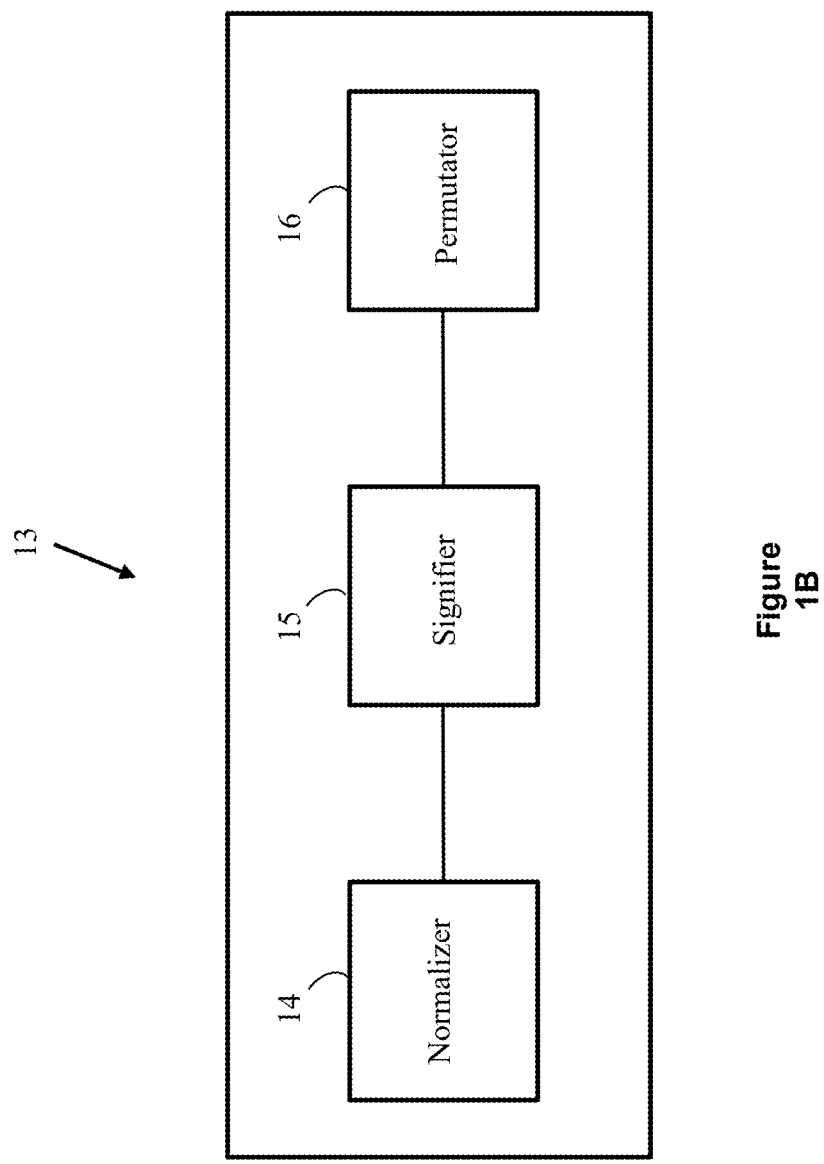
FIG. 1B illustrates a block diagram of an exemplary embodiment of a predictor of the trend predictor of FIG. 1A.

In reference to FIG. 1B, to compare trend data obtained from one source to trend data obtained from a different source, the predictor 13 may include a normalizer 14 that produces normalized trends. For example, the normalizer 14 may normalize the one or more trends from a first source (e.g., a first social media platform) from the multiple sources to the one or more trends from a second source (e.g., a second social media platform) from the multiple sources such that the one or more trends from the first source may be comparable to the one or more trends from the second source.

This is beneficial as the trend data from the first social media platform may be different than trend data from the second social media platform (e.g., a trending post with 100 likes on the first social media platform may be more significant than a trending post with 100 likes on the second social media platform by virtue of different algorithms and different active user bases associated with the first and second social media platforms).

In some implementations, the normalizer 14 may calculate base ratios for the trending posts where each base ratio may correspond to a respective trending post in the plurality of trending posts. The normalizer 14 may further produce normalized trends by normalizing the base ratios including calculating adjusted ratios by scaling base ratios corresponding to trending posts from a first source from the two or more of sources to base ratios corresponding to trending posts from a second source from the two or more sources.

Stated otherwise, to compare the two populations of trend data, the normalizer 14 may determine a coefficient for different cohorts based on a universal value for comparison. In this example, trending posts obtained from a first social media platform may represent a first cohort and trending posts obtained from a second social media platform may represent a second cohort. The normalizer 14 may determine which trend data (and associated source) to use a base for comparison purposes.

More particularly, to utilize a ratio across two different social media platforms, a correlation value as well as universal aspects for calculation may be used. To this end, the normalizer 14 may determine an adjusted trend ratio according to the following equation:

$$(\text{Likes}(w1) + \text{Comments}(w2))/(\text{Followers} + \text{Hashtags}(wq)),$$

where "Likes" represents a total number of likes associated with a trending post on a social media platform, "Comments" represents a total number of comments associated with the trending post on the social media platform (e.g., as a measure of viewer engagement), "w1" represents a weighted value associated with the "Likes", "w2" represents a weighted value associated with the "Comments", "Followers" represents a total number of followers associated with a poster of the trending post, Hashtags represents a base number of hashtags associated with the trending post on the social media platform, and "Wq" represents a weighted value associated with each unique hashtag, averaged.

The normalizer 14 may determine the value of Wq according to the following equation:

$$\left[ -\left( \frac{\text{Platform Total Users}}{(\text{Hashtag Total Views}) + (\text{Hashtag Total Posts})} \right) \right]$$

where "Platform Total Users" represents a total number of platform users of the social media platform, "Hashtag Total Views" represents a total number of views associated with the hashtag, and "Hashtag Total Posts" represents a total number of posts associated with the hashtag. As such, more common hashtags (that would be more likely to make a post appear on the recommended feed of a viewer) affect the ratio more negatively than less common hashtags.

After calculating the adjusted trend ratio for respective trend data populations, the normalizer 14 may determine a standard (i.e., an adjustment value calculation) to compare the populations of the trend data as the trend data comes from two different social media platforms having different algorithms and user bases. The adjustment value calculation may be applied to trending posts of each social media platform to determine correlations.

In the following example, the first social media platform may be used as a base for the standard (e.g., this is similar to the US Dollar being used as a standard currency for global commerce).

The normalizer 14 may determine an average base ratio value x1 associated with the second social media platform according to the following equation:

$$x1 = \frac{(\text{Mean}(\text{Likes [second social media platform]}) + \text{Mean}(\text{Comments[second social media platform]}))}{((\text{Mean (Followers [second social media platform]}))}$$

The normalizer 14 may determine an average base ratio value x2 associated with the first social media platform according to the following equation:

$$x2 = \frac{(\text{Mean}(\text{Likes [first social media platform]}) + \text{Mean}(\text{Comments [first social media platform]}))}{((\text{Mean (Followers [first social media platform]}))}$$

The normalizer 14 may determine the adjustment value between the average base ratios according to the following equation:

$$x1(x3)=x2$$

where x1 represents the average base ratio of the second social media platform, x2 represents the average base ratio of the first social media platform, and x3 represents the adjustment value between the respective average base ratios.

The adjustment value x3 may be used to multiply all base ratios on the second social media platform to compare them to the base ratios of the first social media platform (as the trend data obtained from the first social media platform is used as the base for comparison purposes).

The above-described normalization algorithm is exemplary and other algorithms may be used to normalize trends from multiple sources including, but not limited to, adjustment via Z-score or other standardization method to create comparable populations.

Predicted Significance of Aggregated Trends

After normalizing the trend data obtained from the multiple sources, the predictor 13 may use predictive techniques to establish significance of the normalized trends to obtain significant trends. The predictive techniques may include statistical techniques or any other suitable techniques.

For example, the predictor 13 may include a signifier 15 that uses statistical analysis (e.g., significance tests) to analyze the aggregated trend data to determine significant trends. The results of this analysis may be used to measure the effectiveness of various trends and/or may be incorporated into predictive algorithms to determine the statistical effectiveness of various parameters associated with one or more trends. The signifier 15 may further test trends using dynamic parameters and algorithms, multiple linear regression analytics, and/or any other suitable methods.

These results may allow the techniques of the present disclosure to: (a) be more accurate with predictions for future trends, (b) have a greater understanding of the dynamic variables of what makes a trend, (c) use the historical data to act as a baseline test for models (if models had confirmed historical trends and could successfully predict current trends), (d) potentially reintroduce effective historical trends to an existing market, and (e) combine historical data with current trends that were not available when the historical trend was trending to generate a new trend.

In some implementations, the signifier 15 may test significance of the aggregated trends and declare respective aggregated trends significant trends upon testing. For example, the signifier 15 may test significance of the aggregated trends by comparing respective adjusted ratios to a significance threshold and declaring respective aggregated trends significant trends upon their respective adjusted ratios exceeding the significance threshold.

Stated otherwise, the signifier 15 may determine a threshold of statistical significance in the adjusted ratio (e.g., a specific ratio where a trend moves from noise to a trend/potential trend may be determined). To accomplish this, the signifier 15 may perform a test of significance on the trend data. For example, the signifier 15 may utilize a Shapiro-Wilk test for normal distribution of the trend data (e.g., the Shapiro-Wilk test may be performed to determine a departure from normality of the data).

The results of the Shapiro-Wilk test may indicate that the adjusted ratio is not normally distributed, and, as such, traditional tests of significance would not be subsequently performed. After the Shapiro-Wilk test has been applied, the signifier 15 may utilize a Wilcoxon test to determine whether there is a significant difference between adjusted ratio values.

If the Wilcoxon test shows that there are significant differences between the adjusted ratio values, a threshold must be set for a cutoff value of significant trends to determine what ratio value is indicative of a trend/future trend as opposed to noise.

For the purposes of explanation, a value at which a trend may be labeled as significant may be set at 2.00. It should be noted that, as the trend data may be non-normal, a traditional confidence interval based on the mean of the trend data may not be able to be set, and, as such, the value may be set to a desired value. The significance level can be increased or decreased as needed to increase or decrease the threshold by which a trend is considered a significant trend.

The signifier 15 may confirm whether the variables in determining the adjusted ratio are significant to aid in calculating weighted values. To accomplish this, the signifier 15 may utilize a multiple linear regression (MLR) analysis to determine whether the variables used in calculating the adjusted ratios were significant, and if so, which of the significant variables was the most significant (and should be weighted more in calculating a final ratio).

In some implementations, Comments may be more significant than Likes in determining the adjusted ratios. However, in other implementations, such as, for example, when the signifier 15 utilizes single regression analysis, both variables may be equally significant in determining the adjusted ratios. The final ratio may be further based on a value associated with hashtags, which may positively or negatively skew the final ratio.

In some implementations, the signifier 15 may weight the Hashtags calculating a ratio based on the number of views under that hashtag divided by the total number of users on the respective platform (i.e., total views/total platform users). As such, use of more popular hashtags and a greater number of hashtags would negatively affect the post's overall ratio score, as the use of hashtags does not necessarily reflect an organic spread of a trending post.

After the signifier 15 determines respective final ratios, significant trends may be compared to statistically defined parameters. In one example, the obtained trend data may include 41 total significant trending posts out of a total of 200 trending posts. As multiple trending posts may cover the same meaning of trends, similar trending posts may be combined. For example, similar trends of the 41 total significant trending posts may be combined (e.g., similar significant trending posts may be combined to reduce the number of significant trending posts to 36) based, at least in part, on the calculated ratio and alpha threshold. It should be noted that an alpha threshold value of 2.00 may be adjusted to benefit and/or improve the results of the predictive analytics.

To determine a final base ratio, the signifier 15 may calculate the base ratio values as described above. The signifier 15 may multiply the base ratio values by an appropriate adjustment value, also described above, to produce the final adjusted ratio, of the post as it would be compared to the base source.

As stated above, the predictive techniques used by the signifier 15 may include multiple variations of statistical techniques to generate inputs for predictive analytics. The results of the predictive analytics may be used to determine if there is a demand for former, current, and/or new trends.

The signifier 15 may further determine inputs that affect predictive computational algorithms. For example, results based on the analysis performed by the signifier 15 may serve as inputs into predictive computational algorithms of the predictor 13. The predictor 13 may utilize a variety of predictive methods (e.g., AI techniques) to process the inputs.

For example, the predictive methods may be based, at least in part, on the results of the analysis performed by the signifier 15 and the particular trends associated with the inputs. As predicting trends may be highly dynamic and unpredictable (e.g., trends may be affected by world events, political swings, etc.), the predictor 13 may utilize any suitable predictive method or methods.

The predictor 13 may further obtain contextual data and the predictive methods may be based on the trend data and the contextual data. In some implementations, the contextual data may correspond to one or more fields from a plurality of fields (e.g., geopolitical fields, retail fields, etc.) and/or to geopolitical, social, technological, financial, retail, medical, business data, or any other suitable data. The contextual data may be data that tends to explain why the one or more trends trended at the prior time but are not trending currently and/or why the one or more trends are currently trending but were not previously trending.

Predictive Trend Creation

The data collector 12 may collect trend data from one or more social media platforms that house trends. The trend data may be collected from similar/comparable trending hashtags from the social media platforms to ensure validity of the sample data. In one example, the data collector 12 may collect 100 sample posts from one or more social media platforms. The predictor 13 may clean the trend data and may organize the trend data into usable columns, separated by social media platform, for example.

The predictor 13 may include a permutator 16 that creates predicted trend candidates by producing permutations combining concepts appearing in the trends and/or by producing permutations combining terms appearing in the trends. The trends used for producing such permutations may be raw trends as obtained from the platforms, significant trends as identified by the techniques described above, etc. In one example, a first term from a first trend may be combined with a second term from a second trend. Thus, to predict these so-called compound trends, the permutator 16 may produce permutations of the trend data, be it concepts or terms.

With reference to FIG. 2, in one example, the permutator 16 may use a permutation algorithm 18 to iterate over trend terms that were deemed significant to determine permutations of significant trends.

In some implementations, the permutator 16 may break down each trend into individual logical strings to create the permutations. In this scenario, each trend as stated in an output is not literal and each trend stated in the output may be subject to computerized interpretation of the compounded trend. Associated translations for the sample trend outputs may need to be performed. Sample outputs 20 for the permutations are illustrated in FIG. 3.

After determining the permutations, the permutator 16 may utilize a machine learning model to iterate through the permutations and draw logical connections utilizing natural language recognition/protocol or any other suitable technique.

Each predicted trend candidate may be assigned to a group/code. The average ratio for each trend that devolved into the predicted trend candidate may be tracked along with that code. This is for the purpose of predicting a ratio of the compound trend. The average ratio of trends being compounded may be used to predict a potential ratio of the compound trend. A sample output 22 of the processing performed by the machine learning model is illustrated in FIG. 4.

Interpretation may also have to be performed. For example, if "Tacos potatoes" is an output, that output may not be actually translated to "Tacos potatoes" (i.e., each trend may be broken down into singular terms to make permutations more logical). As such, the interpretation may be a translation from a raw permutation to what is meant by a combination of trends.

Logical compounds may be filtered out, further analyzed, and compared against existing and former trend data. The permutator 16 may validate the predicted trend candidates to produce predicted trends. In some implementations, the permutator 16 may validate the predicted trend candidates by comparing the predicted trend candidates to items listed in one or more databases where at least a partial match of a predicted trend candidate to at least one of the items corresponds to validation. For example, the predictor 13 may perform a Google® search on the predicted trend candidates. A search result or a threshold number of search results resulting from that search may correspond to validation. Predicted trend candidates that produce no search results or a number of search results under the threshold may be discarded as unvalidated, having no meaning (e.g., tacos red cloud).

In other implementations, the permutator 16 may validate the predicted trend candidates by analyzing the predicted trend candidates via artificial intelligence (e.g., machine learning). In yet other implementations, the permutator 16 may validate the predicted trend candidates to determine whether the terms have related meaning and may make adjustments accordingly.

The described method may be utilized to create predicted trends that may correspond to previous trends, new trends, actual products for sale, and products not currently for sale or even yet in existence. The prediction data may be provided to improve and/or influence business models. A sample output 24 of the predicted trends is illustrated in FIG. 5.

The permutator 16 may assign to each of the predicted trends a score. In some implementations, the score may be based, at least in part, on the significant trends in which the combined terms appeared and/or on scores of the trending posts from which the predicted trends were derived.

Now that the predictive/aggregation component has been discussed, the trend generation component and the trend sale component will be described below. As part of the trend generation component and the trend sale component, the predictor 13 may present clean, aggregated, trend information (e.g., predicted trends, combined trends, significant trends, etc.) as a trend market to users of an application and/or website. The trend market may include a customer interface that may allow users to purchase trends and/or users to obtain the information about the predicted trends from multiple sources in one place. In some implementations, the trend market may be an environment similar to a consumer-driven marketplace.

Trend Markets

In the trend market, the users may browse the trend information and may create trend communities (e.g., trend clubs) based on a particular trend and/or trends. The predictor 13 may present the aggregated trends to the users and may receive from the users an indication of desirability for one or more of the predicted trends. The predictor 13 may further provide a trend search engine in which a user searches and search results are one or more of the predicted trends.

Users may propose new trends based on other trends and the proposed trends may be voted on to determine whether the proposed trend is popular within the respective trend community. If a proposed trend passes a popularity threshold, the trend data associated with the proposed trend may be stored and presented to consumers and/or business owners (as well as trend information from the predictive/aggregation component) via the trend market. As a further part of the trend generation component, the predictor 13 may effectuate production of a product or services that did not previously exist and created based on the predicted trends.

As such, the predictor 13 may make available to potential purchasers at least one of: data reflecting the predicted trends, or product or services created based on the predicted trends. The predictor 13 may facilitate producing product or services that did not previously exist and created based on the predicted trends.

Predictive Algorithms

Figure 6:
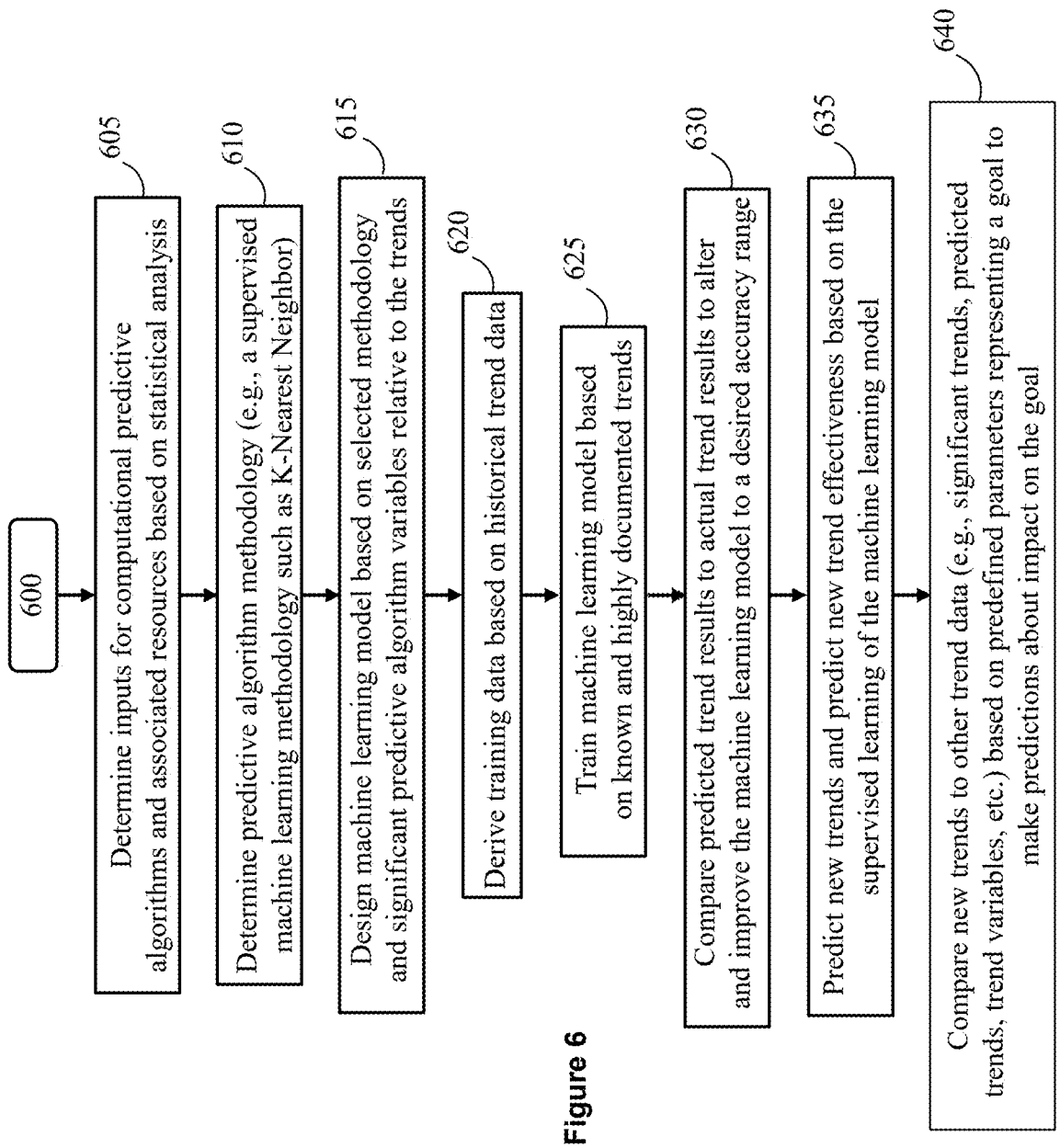
FIG. 6 illustrates a flow diagram for an exemplary predictive algorithm.

As stated above, the predictor 13 may utilize any suitable predictive algorithm to process the trend data. Exemplary predictive algorithms utilized by the predictor 13 will now be described herein. FIG. 6 illustrates a flow diagram for an exemplary predictive algorithm 600 utilized by the predictor 13. At 605, the method 600 may determine inputs for computational predictive algorithms and associated resources based on statistical analysis. At 610, the method 600 may determine a predictive algorithm methodology (e.g., a supervised machine learning methodology such as K-Nearest Neighbor). At 615, the method 600 may design a machine learning model based on the selected methodology and significant predictive algorithm variables relative to the trends. At 620, the method 600 may derive training data based on historical trend data (e.g., known and highly documented trends). At 625, the method 600 may train the machine learning model with the training data based on the historical trend data. At 630, the method 600 may compare predicted trend results to actual trend results to alter and improve the machine learning model to a desired accuracy range. At 635, the method 600 may predict new trends and predict new trend effectiveness based on the supervised learning of the machine learning model (e.g., the results or outputs of the machine learning model are an array of predicted trends that have defined significant variables and that have a statistically significant confidence). At 640, the method 600 may compare new trends to other trend data (e.g., significant trends, predicted trends, trend variables, etc.) based on predefined parameters corresponding to a goal (e.g., monetization, positive social change, medical applications, etc.) to make predictions about impact of the new trends on such goal. For example, new trends may be compared to significant trends (e.g., statistically similar trends that have had an impact in the past) to make predictions about the potential impact of the new trends. This way, the potential impact (e.g., market impact, social change, medical applicability or impact, etc.) of new trends that are not yet available anywhere may be predicted.

Figure 7:
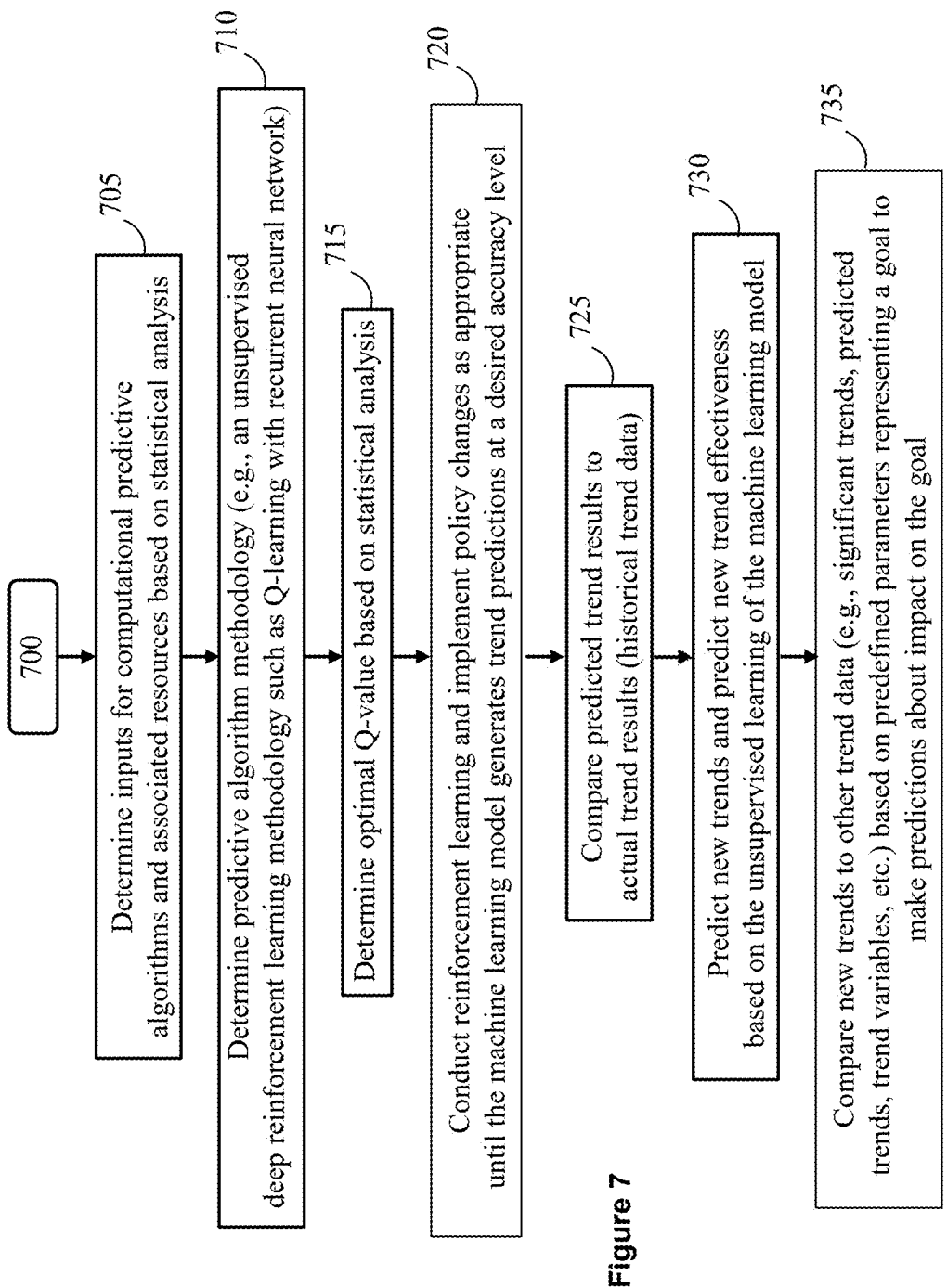
FIG. 7 illustrates a flow diagram for another exemplary predictive algorithm.

FIG. 7 illustrates a flow diagram for another exemplary predictive algorithm 700 utilized by the predictor 13. At 705, the method 700 may determine inputs for computational predictive algorithms and associated resources based on statistical analysis. At 710, the method 700 may determine a predictive algorithm methodology (e.g., an unsupervised deep reinforcement learning methodology such as Q-learning with recurrent neural network). The Q-learning with recurrent neural network predictive algorithm may be useful in handling stochastic transition problems and rewards without requiring adaptation. Stated otherwise, methodology for implementing Q learning using a Recurrent Neural Network (RNN) may be utilized to make predictions in a dynamic environment. At 715, the method 700 may determine optimal Q-value based on statistical analysis. At 720, the method 700 may conduct reinforcement learning and implement policy changes as appropriate until the machine learning model generates trend predictions at a desired accuracy level. At 725, the method 700 may compare predicted trend results to actual trend results (e.g., historical trend data). At 730, the method 700 may predict new trends and predict new trend effectiveness based on the unsupervised learning of the machine learning model. At 735, the method 700 may compare new trends to other trend data (e.g., significant trends, predicted trends, trend variables, etc.) based on predefined parameters corresponding to a goal (e.g., monetization, positive social change, medical applications, etc.) to make predictions about impact of the new trends on such goal. For example, new trends may be compared to significant trends (e.g., statistically similar trends that have had an impact in the past) to make predictions about the potential impact of the new trends. This way, the potential impact (e.g., market impact, social change, medical applicability or impact, etc.) of new trends that are not yet available anywhere may be predicted.

For example, comparisons may be made between previous trends and current trends (utilizing any machine learning model results as a baseline). The predicted trend results from the machine learning models may be continuously compared to previous trend data, which may aid in determining causal relationships associated with the machine learning models. The results provided by the machine learning models may be used to shape business models relative to the predicted trends. As such, consumers may be able to influence business models via trends as opposed to vendors being solely responsible for determining business models. This is beneficial as options and knowledge related to products in the marketplace are improved. As such, businesses may be able to tailor products around the predicted new trends and historic trends that may be capable of trending again (e.g., being reintroduced for purchase by a consumer).

Figure 8:
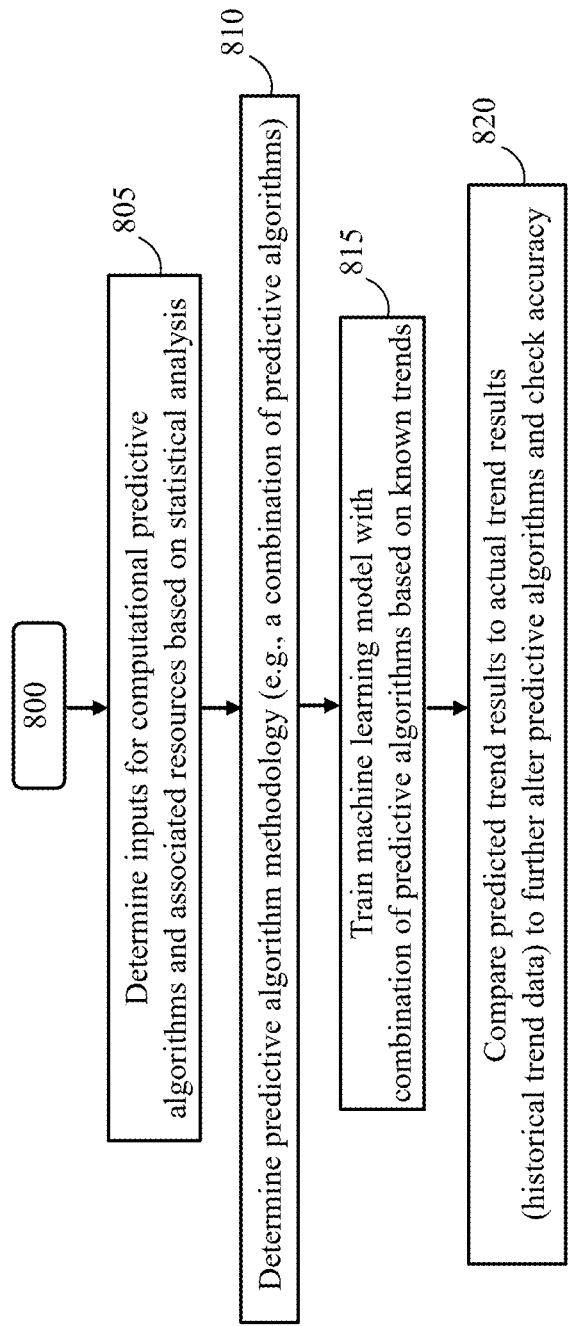
FIG. 8 illustrates a flow diagram for another exemplary predictive algorithm.

FIG. 8 illustrates a flow diagram for another exemplary predictive algorithm 800 utilized by the predictor 13. At 805, the method 800 may determine inputs for computational predictive algorithms and associated resources based on statistical analysis. At 810, the method 800 may determine a predictive algorithm methodology. For example, the method 800 may utilize a combination of predictive algorithms as the determined methodology. At 815, the method 800 may train the machine learning model with the combination of predictive algorithms based on known trends. At 820, the method 800 may compare predicted trend results to actual trend results (historical trend data) to further alter predictive algorithms and check accuracy.

While FIGS. 6 through 8 illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. Further, real time processing and/or batch processing may be used to analyze the data.

Trend Classification

It should be noted that as trends may not be associated with a singular concept, the trends may be classified in multiple ways. Three exemplary classification techniques may be provided as follows: (1) Combination/Improvement; (2) Lateral innovation (compoundment); and (3) Innovation.

Combination/improvement may be defined as the act of combining different ideas to improve upon a previous idea. For example, a freeze-dried ice cream trend may be combined with a trend of skittles/putting M & Ms in everything to a create freeze dried candy trend, such as, for example, a freeze-dried skittle trend and/or predicting to use freeze dried skittles/M&Ms in ice cream as a trend.

Lateral innovation (compoundment) may be defined as the act of combining two or more ideas to create a completely new idea, regardless of improvement. For example, the act of combining a trend towards keto diets with a trend towards making things smaller (e.g., cutesy trends—such as mini pancakes) and a trend towards ethnic cuisines (e.g., a trend associated with Mexican cuisines to create mini keto tacos). The new trends may not be an improvement upon a previous idea, but the new trends may be a new idea rooted in compounding previous ideas.

Combining these techniques with other techniques based on trends may be considered an invention to produce inventions (i.e., Innovation). Inventions, in general, are a way to combine what is known in new ways. In this example, what is known are the trends, and combining the trends in new ways leads to innovation and therefore inventions.

Alternative Techniques

Alternative techniques to performing the permutation technique as described above may be utilized to achieve the same and/or substantially the same results as the permutation technique. One exemplary alternative technique that the predictor 13 may utilize is a confidence interval (CI) estimation technique, which does not utilize significance-based statistics (i.e., a CI estimation technique lacks significance tests (e.g., null hypothesis significance testing (NHST)).

An exemplary use of the CI estimation technique will be described herein. In this example, the data obtainer 11 may obtain the trend data in substantially the same manner as described above; however, in some implementations, the data obtainer 11 may have access to a universal repository of all trend data, and, in that instance, the data obtainer 11 would have direct access to the trend data.

The obtained trend data may be referred to as example data. The predictor 13 may standardize and/or normalize the example data for comparison purposes. The predictor 13 may group the trends in subsets to create a forest plot based on the trends. It should be noted that forest plots may be used in this example as calculable values as CIs may be determined. The forest plots may be used in meta-analysis to determine important trends in a similar manner to how the CI estimation technique is utilized in academic research.

The forest plots may be operationally defined as grouped box plots of the calculable value of a given subset of trends (e.g., trending posts) containing upper and lower bounds and the CI of the calculable value. The grouped subsets of the same trends may be used to determine a more accurate picture of important trends and move toward an expectation value of each trend.

The predictor 13 may normalize the example data by any suitable method, such as, for example, by calculating a variance between a calculable value of each trend source and making suitable adjustments. The predictor 13 may group the normalized example data into subsets with a calculable value (in this instance, a mean of several aspects of comparison between trends, such as, for example, Likes, Comments, Hashtags, etc.) serving as the basis of a CI.

For purposes of this exemplary use of the CI estimation technique, the mean calculable value of subset data (M) may be used to determine a CI for each of the subset points based on the margin of error. The M value may be any combination of numbers or singular data points, so long as the M value may translate and be comparable across trend sources.

In this exemplary use of the CI estimation technique, a subset of 6 data points and 5 degrees of freedom (df) may be utilized. The standard deviation from the sample mean of this subset of 6 data points and 5 df may be calculated to be 4.285. Knowing the df of the subset, as well as the variance and sample mean, the CI may be calculated to be (−1.389, 7.551, M=3.08). As this is an example subset, the error and CI may be very large. In practice, the subsets actually used to create a predictive model based on CI Estimation may be much larger and more accurate in terms of lower/upper bound than the present example.

The collective data may be used to create a forest plot of CI values, which may then be used to determine which trends are important based on the various subsets of data reflecting those trends, their mean values, and their CIs. This graphing may provide insight to which trends are important, and to what calculable value may be required to deem a trend a true trend as opposed to an unimportant trend, based on the CI range that the calculable value would sit on relating to that trend. The important trends, based on the CI plots of the trend subsets, may be pulled from the data for permutations.

The permutator 16 may permutate and validate predicted trends. The predicted trends deemed important, as well as analyzed trends, may be available for use. The permutated predictions may also be put against the subset population CIs to compare accuracy of those predictions, and the significant predictions in this population may be presented to the public/deemed significant enough for use.

The forest plot may further allow insight to be gained related to variances of trends that required a higher/lower calculable value in order to be considered important based on their CIs and subset means. As such, the CI estimation technique of this example may be more dynamic and accurate in its ability to produce important trends for permutations compared to other methods.

Another alternative technique to the permutation technique that may be utilized for the prediction aspect of the present disclosure is a Natural Language Processing (NLP) combined with Sentiment Analysis (SA) technique, which also does not use statistical analyses. In this example, sentiment analysis and computerized NLP may be utilized as a mode of achieving the predictive results of the present disclosure.

In this example, the data obtainer 11 may obtain the trend data; however, parameters associated with obtaining the trend data may be different compared to other techniques. In this example, the only data assets required may be a Comment section of a post, actual text of hashtags, and any associated title tags/caption of the post.

The data may be collected in mass and organized by post. Each separated word in a post's caption and comment section may be given a numeric score in the range (−5, 5) based on a sentiment value of a word. For example, positive words may receive a higher score compared to negative words. The scores may be totaled and posts that score higher in positive sentiment may be pulled from the collective. For the purposes of this example, the sentiment score of five example posts is provided as follows: a) Caption: 1, 0, 0, 2, 4; b) Comments (Avg): 1, −1, 0, 0, 3; c) Hashtags: 2, 1, 1, 0, 3; and d) Title: 1, 1, 2, 2, 3.

In this example, the example posts may reveal positive sentiment from the comment section on two posts, but only one post with any constant positive sentiment. Additionally, the poster tended to use positive sentiment in the title and hashtags of their post, but, according to the sample, the audience did not necessarily act in any reflection of the attitude of the poster.

Thus, trends analyzed by this technique may be judged based on the sentiment of people seeing a trending post. If people have good things to say about the post, those posts would score higher and be used for prediction/judged as important trends. If the technique of this example is combined with other methods of the present disclosure, the sentiment score of a post may be used as an additional calculable value. This technique may provide insights on the effect that a given poster has on specific trends by gauging how the sentiment of the poster is reflected by the sentiment of the comments. NLP may be used to gauge several other aspects of the sentiment of the post, as well as other ideas behind the trend, as the words used may, on occasion, lead to mixed results.

NLP may further be used to determine ideas behind a trend. For example, a post about cheesecake that is trending may not just be trending because it is about cheesecake. Analysis of the comments or caption may reveal that the trend is rooted in a liking of the aesthetically pleasing color palette, or the fact that cheesecake is an item that could be made easily at home.

As another example, comments that say a trend looks "yummy" or looks "delicious" or "pretty" may be indicative of a correlating factor behind the reason why that post trended as it did. A typical audience generally likes posts that look appealing, are related to sweet foods, and/or have a professional presentation.

The technique of this example may utilize NLP in combination with sentiment analyses to categorize likes and comments based on themes and present insight into a trend itself. In this example, a post that gained the most positive sentiment from the sentiment analysis measures may also have had overarching themes of appeal relating to aesthetics, desserts, trying it themselves, and warm coloration. Combining the information gained from the sentiment analysis and NLP may yield information relating to what the audience was judging as important in terms of trends as well as why those trends were important to the audience. The combined data may be used to pull the trends that are rated as the most positive by the audience for prediction.

The NLP analyses on these trends may create points for clustering trends based on overarching themes. The clustering model may be created to provide insight into predicted effectiveness of permutated trends based on the clustering or permutation of the trend theme. These permutations may create new predicted trends that would be rooted in the existing opinions of the audience. These combinations may be used to predict what trends would yield high sentiment based on existing NLP and sentiment data. Thus, the permutated predictions may be deemed ready for use. It should be noted that this step may be used in accordance with other methods of the present disclosure to increase effectiveness ratings of permutated trends, as the permutated trends would be able to be fine tuned according to the predicted appealing and positive ideas attached to those trends. As such, the technique of this example may provide a deeper picture into the reasons behind trends (e.g., the ideas attached to the terms associated with the trends).

Another alternative method that may be utilized to predict trends may include an advanced development technique, which also does not necessarily utilize statistical methods. For example, an advanced development technique may utilize true AI (i.e., AI that is truly independent). In this example, the true AI may collect and organize the trend data. The true AI may parse the trend data and may group the parsed trend data based on similarities and ideas associated with the trends as opposed to being grouped solely on the trend itself. The method may draw upon connections that a human mind cannot comprehend.

For example, in nature, many seemingly unrelated things are connected via a pattern to another thing. Trends of trends may apply to multiple different disciplines. As such, the method may be able to predict currently unforeseen trends (e.g., trends that are not obvious and that are unlikely to be understood and/or found by humans in the near future relative to trends in physics, chemistry, or a variety of other fields). The unforeseen trends may be determined by the true AI designed to detect and interpret the unforeseen trends faster and more efficiently than would ever be capable by a human mind.

For example, the connections may be grouped and rated for effectiveness based on a combination of techniques created by the true AI to solve a particular problem. In this example, trends that fall within high effective connections may be taken as a subset and trends within the subset may be combined with new and other effective trend ideas by the true AI to produce optimal effectiveness predicted trends and ideas that the true AI would be confident a consumer base would accept.

The new predicted trends may be presented to consumers. The true AI may also indicate how to build/develop the predicted trends deemed significant and desired by consumers, and such predicted trends may be deemed ready for use. The true AI may utilize massive data repositories to simultaneously validate data. The basis behind machine learning is pattern recognition. Therefore, if true AI gains access to trend data, comprehends the ideas behind the trend data, and makes decisions based on effectiveness, it is entirely possible to derive new predictions of what will trend based on the known computations of new patterns. A combination of the techniques of the present disclosure and an advanced technology system may be utilized as true AI.

The alternative techniques described herein stand to give a representation of possible techniques that may be used to effectively produce predictive results while taking alternative routes to obtain those results. Next, strengths and weaknesses associated with the techniques of the present disclosure will be described herein.

Strengths associated with significance testing/permutation techniques may include implementation efficiency, requiring varying levels of processing power, being able to provide an accurate assessment of what trends are important based on mathematical data, being able to produce permutated trends based on significant trends, and being able to assess permutated trends in multiple ways after initial analyses, and, as such, significance testing/permutation techniques are flexible techniques. As such, these techniques may utilize a scientific, mathematical, statistical and heuristic approach to determine trends. Weaknesses associated with significance testing/permutation techniques include being limited in understanding deeper ideas behind trends, susceptibility of leaving trends behind because a value is applied to all trends, and an alpha threshold of a trend that may vary from a calculated blanket threshold.

Strengths associated with CI/Permutation techniques may include allowing for varying levels of trend importance, which fixes a blanket threshold problem of significance testing giving a highly accurate assessment of what trends are important, and, as such, a more accurate output of effective permutated trends. Weaknesses associated with CI/Permutation techniques may include having an inefficient means of achieving predictive results and being potentially limited in its ability to adapt to creating a calculable value of different trend sources.

Strengths associated with sentiment analyses/NLP/permutation techniques may include providing a greater understanding behind why a trend is deemed positive by consumers, allowing for unfiltered analyses of trends, theoretically the most accurate measure of what trend is deemed positive, and allowing permutated results to be based on community sentiment towards trending ideas. Weaknesses associated with sentiment analyses/NLP/permutation techniques may include inefficiency in producing mass outputs and being potentially limited in analyses of important trends as there is no involved statistical cutoff. While permutated trends may be more accurate to the ideas behind a trend, the trending objects themselves may be more difficult to narrow down.

With respect to both current and advanced methods, an Expectation Value, as well as other clarification concepts from other fields could be used as a technique to determine a true trend value of a trending idea. Operationally, a "True Trend Value" may be defined as a true expected value (based on Expectation Value calculations and weighted by a coefficient of an individual trending concept) of a given trending idea over a highest possible likelihood of that value occurring (weighted by the coefficient of the individual trending concept). Expectation Values may be utilized to determine the expected and most likely effectiveness of a trend incorporating trending ideas (e.g., aesthetically pleasing, nostalgic for a given generation, etc.) As an example, even though a competitor's product may have better specifications than a seller's product, the seller's product may sell more successfully than the competitor's product based on a trending idea of being nostalgic for a given generation (i.e., for consumers, nostalgia associated with the seller's product outweighed the better specifications of the competitor's product).

As trending data may be calculated and used by the techniques of the present disclosure, the trending data, as it is conceptualized within the bounds of the present disclosure, may provide enough data points in accordance with each trend to calculate the True Trend Value as well as the likelihood of that value occurring, and thus calculate the Expectation Value of a particular trend. This is one of the statistical alternatives that is highly valuable towards gaining insight into trends made possible by the data accumulation and interpretations created by the present disclosure.

While the different ways of achieving the desired results of the present disclosure have been described herein, any combination of techniques could be used to great effect to address the weaknesses and bolster the strengths of any particular implemented technique.

Figure 9:
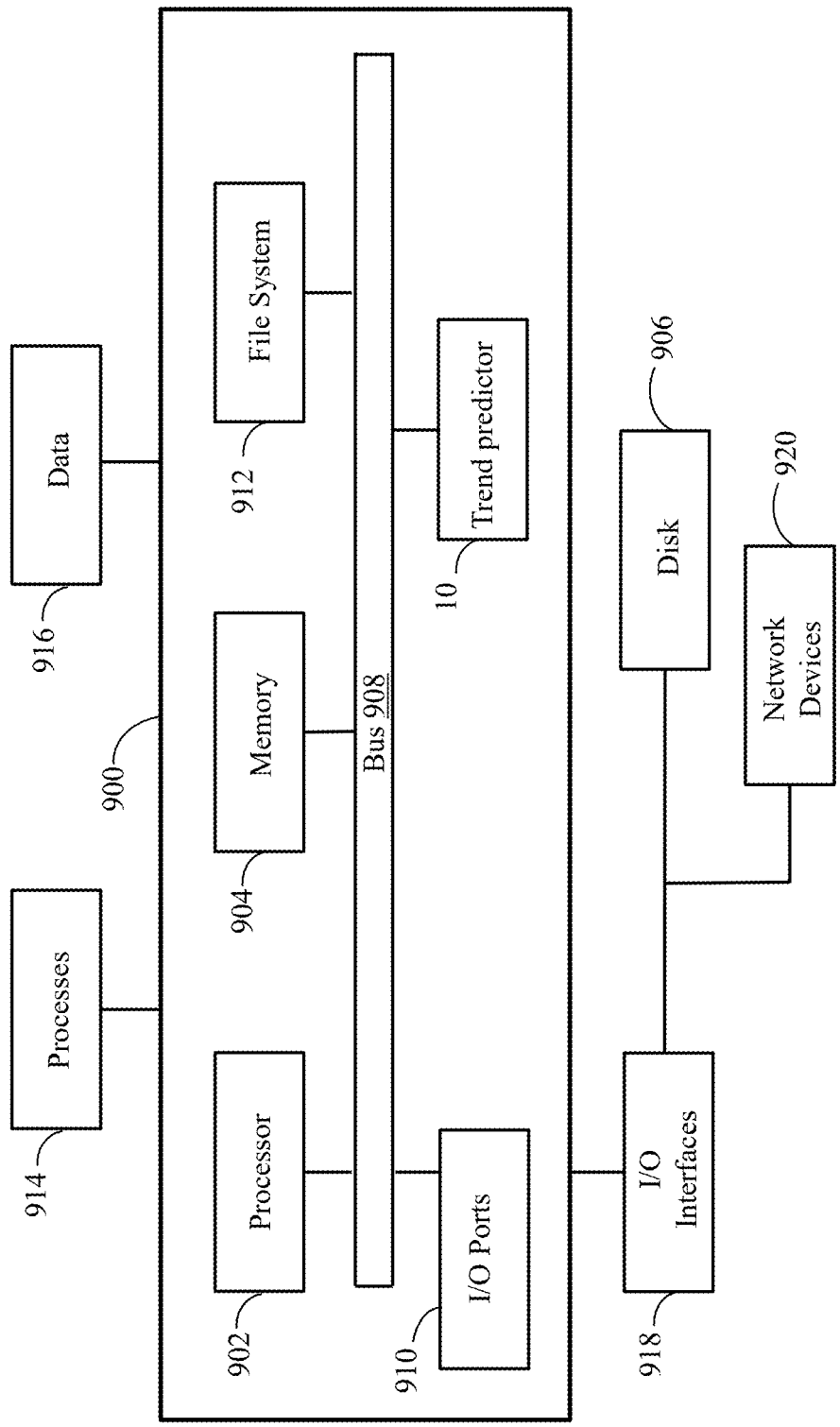
FIG. 9 illustrates a block diagram of an exemplary machine for predicting a trend.

FIG. 9 illustrates a block diagram of an exemplary machine 900 for predicting a trend. The machine 900 includes a processor 902, a memory 904, I/O Ports 910, and a file system 912 operably connected by a bus 908.

In one example, the machine 900 may transmit input and output signals via, for example, I/O Ports 910 or I/O Interfaces 918. The machine 900 may also include the trend predictor 10 and its associated components. Thus, the trend predictor 10, and its associated components, may be implemented in machine 900 as hardware, firmware, software, or combinations thereof and, thus, the machine 900 and its components may provide means for performing functions described herein as performed by the trend predictor 10, and its associated components (data obtainer 11, storage medium 12, predictor 13, normalizer 14, signifier 15, and permutator 16).

The processor 902 can be a variety of various processors including dual microprocessor and other multi-processor architectures. The memory 904 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM). The processor 902 and memory 904 can further include cloud computing resources and cloud storage resources, respectively.

A disk 906 may be operably connected to the machine 900 via, for example, an I/O Interfaces (e.g., card, device) 918 and an I/O Ports 910. The disk 906 can include, but is not limited to, devices like a magnetic disk drive, a solid-state disk drive, a floppy disk drive, a tape drive, a Zip drive, a flash memory card, or a memory stick. Furthermore, the disk 906 can include optical drives like a CD-ROM, a CD recordable drive (CD-R drive), a CD rewriteable drive (CD-RW drive), or a digital video ROM drive (DVD ROM). The memory 904 can store processes 914 or data 916, for example. The disk 906 or memory 904 can store an operating system that controls and allocates resources of the machine 900. The disk 906 can further include cloud computing resources and cloud storage resources, respectively.

The bus 908 can be a single internal bus interconnect architecture or other bus or mesh architectures. While a single bus is illustrated, it is to be appreciated that machine 900 may communicate with various devices, logics, and peripherals using other busses that are not illustrated (e.g., PCIE, SATA, Infiniband, 1394, USB, Ethernet). The bus 908 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 900 may interact with input/output devices via I/O Interfaces 918 and I/O Ports 910. Input/output devices can include, but are not limited to, a keyboard, a microphone, a pointing and selection device, cameras, video cards, displays, disk 906, network devices 920, and the like. The I/O Ports 910 can include but are not limited to, serial ports, parallel ports, and USB ports.

The machine 900 can operate in a network environment and thus may be connected to network devices 920 via the I/O Interfaces 918, or the I/O Ports 910. Through the network devices 920, the machine 900 may interact with a network. Through the network, the machine 900 may be logically connected to remote devices. The networks with which the machine 900 may interact include, but are not limited to, a local area network (LAN), a wide area network (WAN), and other networks. The network devices 920 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 920 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method of training a machine learning model for predicting trends, the method executed by a computer coupled with one or more processors and a memory for storing instructions executable by the one or more processors, the method comprising:

generating, by the one or more processors, a machine learning (ML) model by:
obtaining, by the one or more processors, historical trend data from sources, historical trend data including information about trending posts as defined by respective sources, each trending post corresponding to one or more historical trends;
deriving training data based on the historical trend data by extracting, by the one or more processors, one or more historical trends from the historical trend data; and
training, by the one or more processors, the ML model using one or more predictive algorithms based on the training data by producing, by the one or more processors, permutations by combining terms or concepts appearing in historical trends to create trend candidates using statistical analysis to combine a first term or concept from a first trend with a second term or concept from a second trend, wherein producing permutations further comprises producing products or services that did not previously exist and are configured to be created based on predicted trends; and
altering, by the one or more processors, the one or more predictive algorithms based on comparing the predicted trends to actual trend results to improve accuracy of the one or more predictive algorithms.

2. The method of claim 1, comprising:
assigning to each predicted trend candidate a score based on scores of trending posts in which the first term or concept from the first trend combined with the second term or concept from the second trend appeared; and
predicting trends based on the scores.

3. The method of claim 1, comprising:
validating one or more predicted trend candidates to produce predicted trends.

4. The method of claim 3, wherein the validating further comprises determining one or more unforeseen trends by using artificial intelligence (AI) in combination with the ML model.

5. The method of claim 3, wherein the validating includes analyzing one or more predicted trend candidates via statistical techniques and methods to arrive at validation.

6. The method of claim 3, wherein the validating includes determining whether the terms have related meaning.

7. The method of claim 3, wherein the validating includes comparing one or more predicted trend candidates to items listed in one or more databases, wherein at least a partial match of a trend candidate to at least one of the items corresponds to validation.

8. The method of claim 3, comprising:
making available to potential purchasers at least one of:
data reflecting the predicted trends, and
product or services created based on the predicted trends.

9. The method of claim 3, comprising:
producing product or services that did not previously exist and created based on the predicted trends.

10. The method of claim 3, further comprising:
providing a trend market including a customer interface configured for users to purchase the predicted trends.

11. The method of claim 3, further comprising:
providing a trend outlet including a customer interface configured for users to obtain information about the predicted trends from multiple sources in one place.

12. The method of claim 3, further comprising:
providing a trend market including a customer interface configured for users to propose new trends based on the predicted trends.

13. The method of claim 3, comprising:
continuously improving, via real time or batch processing, results associated with subsequent trend candidates and subsequent predicted trends by comparing the predicted trends to trend data.

14. The method of claim 3, comprising:
determining a confidence level associated with the predicted trends.

15. The method of claim 1, comprising:
normalizing the plurality of trending posts from a first source to trending posts from a second source.

16. The method of claim 1, comprising:
using predictive techniques to establish significance of one or more predicted trend candidates to obtain significant predicted trends.

17. The method of claim 16, comprising:
making available to potential purchasers at least one of:
data reflecting the significant predicted trends, and
product or services created based on the significant predicted trends.

18. The method of claim 16, comprising:
producing product or services that did not previously exist and created based on the significant predicted trends.

19. The method of claim 16, further comprising:
providing a trend market including a customer interface configured for users to purchase the significant predicted trends.

20. The method of claim 16, further comprising:
providing a trend outlet including a customer interface configured for users to obtain information about the significant predicted trends from multiple sources in one place.

21. The method for predicting trends of claim 1, wherein the method further comprises:
predicting trends for attaining a goal; and
determining, by the trained ML model, an impact on the goal by comparing predicted trends to historical trend data.

22. A method of training a machine learning model for predicting trends, the method executed by a computer coupled with one or more processors and a memory for storing instructions executable by the one or more processors, the method comprising:
generating, by the one or more processors, a machine learning (ML) model by:
obtaining, by the one or more processors, historical trend data from sources, historical trend data including information about trending posts as defined by respective sources, each trending post corresponding to one or more historical trends;
deriving training data based on the historical trend data by extracting, by the one or more processors, one or more historical trends from historical trend data; and
training, by the one or more processors, the ML model using one or more predictive algorithms based on the historical trend data by producing, by the one or more processors, permutations by combining concepts in historical trends to trend candidates using statistical analysis to combine a first concept from a first trend with a second concept from a second trend, wherein producing permutations further comprises producing products or services that did not previously exist; and
altering, by the one or more processors, the one or more predictive algorithms based on comparing the predicted trends to actual trend results to improve accuracy of the one or more predictive algorithms.

23. The method of claim 22, comprising:
assigning to each predicted trend candidate a score based on scores of the plurality of trending posts in which the first concept from the first trend combined with the second concept from the second trend appeared; and
predicting trends based on the scores.

24. The method of claim 22, comprising:
validating trend candidates to produce predicted trends.

25. The method of claim 24, wherein the validating further comprises determining one or more unforeseen trends by using artificial intelligence (AI) in combination with the ML model.

26. The method of claim 24, wherein the validating further comprises analyzing trend candidates via statistical techniques and methods leading to predicted trends.

27. The method of claim 24, wherein the validating includes determining whether the first concept from the first trend combined with the second concept from the second trend has related meaning.

28. The method of claim 24, wherein the validating includes comparing trend candidates to items listed in one or more databases, wherein at least a partial match of one or more trend candidates to at least one of the items lead to one or more predicted trends.

29. The method of claim 22, comprising:
normalizing the plurality of trending posts from a first source to trending posts from a second source.

30. The method of claim 22, comprising:
using predictive techniques to establish significance of the trend candidates to obtain significant trends; and
predicting trends based on established significance.

* * * * *